Oct. 10, 1933.  S. B. RENNERFELT  1,929,935

SPRING INJECTION FUEL PUMP

Filed May 7, 1932

Witnesses
A. Sandelin
Erik Palmgren

Inventor.
Sven Bernhard Rennerfelt

Patented Oct. 10, 1933

1,929,935

UNITED STATES PATENT OFFICE 1,929,935

SPRING INJECTION FUEL PUMP

Sven Bernhard Rennerfelt, Stockholm, Sweden

Application May 7, 1932, Serial No. 609,801, and in Sweden November 7, 1930

2 Claims. (Cl. 103—154)

This invention relates to fuel pumps for heavy oil internal combustion engines, designed to work at variable speeds.

It is known to use spring loaded plungers for such pumps, and with these at the beginning of the pressure stroke the plunger rests on the oil and at the moment when the oil is to be injected, a valve in the pressure pipe opens a connection to the atomizer. The quantity of oil to be injected is regulated by causing the plunger to stop against a lever at the end of its stroke. This system has certain objections; for example, when the plunger hits the lever with great speed there will be a violent knock which will cause vibrations in the pipe and the pressure of the oil falls at the end of the injection period causing it to flow at a slower rate.

The object of this invention is to provide a fuel pump which overcomes these objections. It is mainly characterized thereby, that the pressure stroke of the plunger is stopped by the plunger covering a hole in the pump cylinder, which hole is connected to the oil pipe leading to the atomizer, so that the plunger is caused to rest on the oil enclosed in the cylinder. It is also characterized thereby, that the plunger is made as a differential plunger with a pressure space between the two diameters of the plunger and that the edge of the one diameter at the end of the pressure stroke covers the hole in the pump cylinder. It is further characterized by the end of the larger diameter being cut away to a varying depth round its edge and the plunger being so connected by means of a coupling with a regulating shaft, that by turning the regulating shaft and the plunger relative to the cylinder, the edge of the plunger covers the hole in the cylinder earlier or later during the pressure stroke.

In the accompanying drawing which illustrates this invention:

Figures 1, 2, 3:
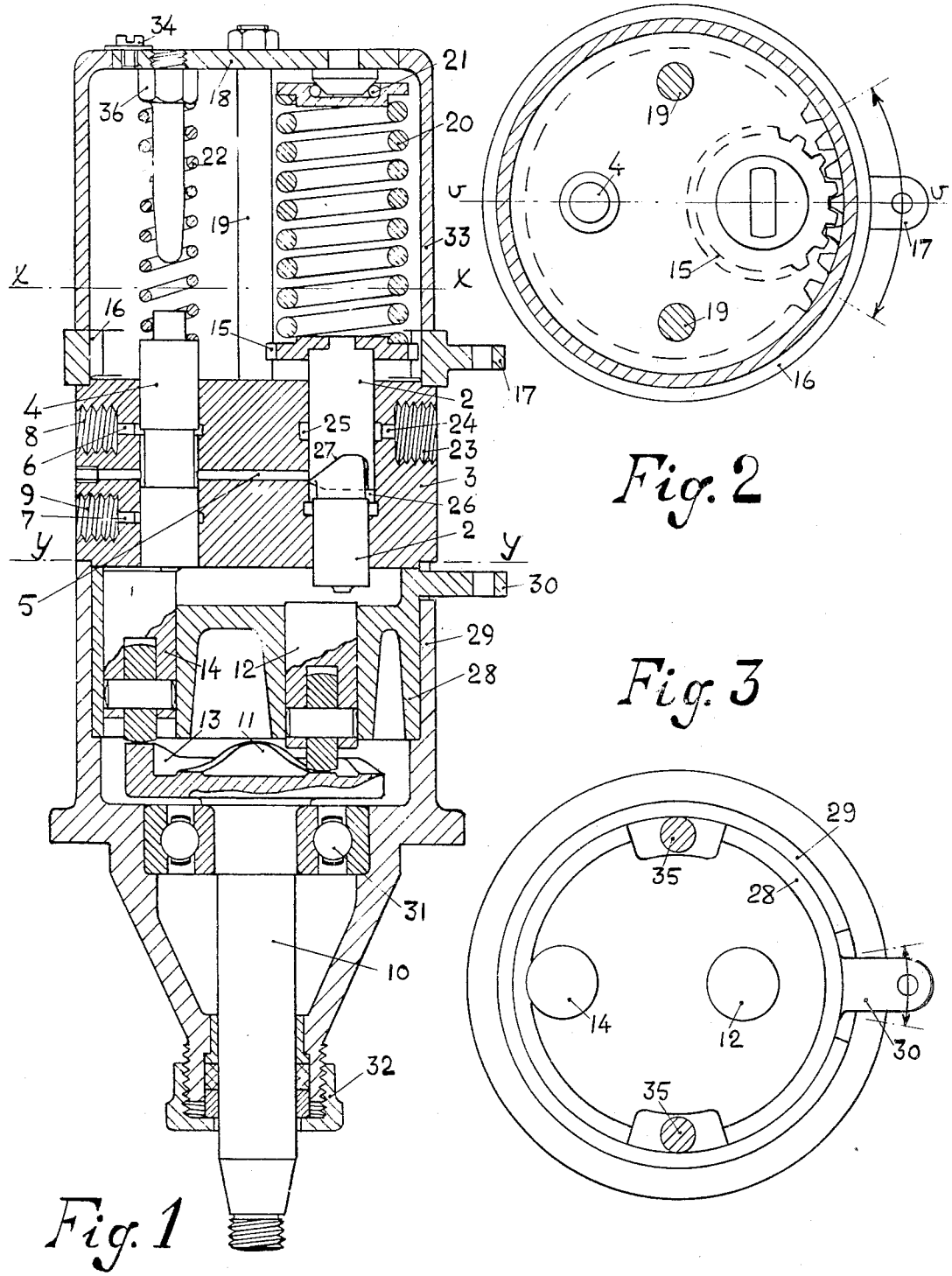
Figure 1 is a longitudinal section of a fuel pump for a two cylinder engine at lines v—v in Figure 2.
Figures 2 and 3 show cross sections of the pump on lines x—x and y—y on Figure 1 respectively.

In Figure 1, 2 is the differential plunger in a pump cylinder 3. A slide 4 is provided between the channel 5 from the plunger 2 and the channels 6 and 7 leading to the pipe unions 8 and 9, where the pipes to the atomizers are to be fastened. The shaft 10 is provided with an inner cam 11 by means of which the rod 12 lifts the differential plunger 2 and an outer cam 13 by which the rod 14 lifts the slide 4. The differential plunger is provided with a pinion 15 which coacts with an internal gear 16 which may be turned by a lever 17. The yoke 18 is fastened to the pump cylinder by screws 19. A spring 20 is pressed between the pinion 15 and a ball bearing 21. The slide 4 is pressed against the cam 13 by means of a spring 22. The suction pipe is to be fitted to the pipe union 23 and a channel 24 leads to the annular groove 25, which, when the differential plunger is at its highest position, is connected with the annular space 26 between the two diameters of the differential plunger 2. The end of the larger diameter of the plunger 2 is cut away to a varying depth forming an edge 27. The rods 12 and 14 work in a cage 28, rotatably mounted inside the cover 29, which cage 28 is provided with a lever 30. The shaft 10 is provided with a ball bearing 31 and a stuffing box 32 to retain lubricating oil in the cover 29. The cover 33 is fastened by means of screws 34. The cover 29 is fastened to the pump cylinder 3 by screws 35. The spring 22 is mounted on a rod 36.

In Figure 1 the plunger and the slide are shown after injection and with the regulating shaft of the plunger in position for middle delivery. The slide 4 is in its highest position. This fuel pump works in the following manner:

The shaft 10 with the cams 11 and 13 is driven by the motor. The cam 11 lifts the differential plunger 2 to its highest position by means of the rod 12. Oil streams from the suction pipe connected to the pipe union 23 through the channel 24 into the annular groove 25 which is now in connection with the annular space 26. The slide 4 prevents communication between the channels 5 and 6 or 7. As the shaft rotates further the differential plunger 2 moves downwards whereby the connection between the groove 25 and the annular space 26 is cut off and the plunger rests on the oil. As the shaft 10 moves further, the cam 13 moves the slide 4 to connect the channel 5 with the channel 6 or 7. The plunger 2 moves downwards by pressure of the spring 20 and presses the oil through the atomizer connected to the union 6 or 7. When the edge 27 covers the channel 5, the plunger 2 once more rests on the oil and the injection is ended. After the slide 4 has reached its furthest position it reverses its movement and again prevents communication between the channels 5 and 6 or 7. By turning the lever 17 and the gear 16, the pinion 15 and the plunger 2 are turned, and the edge 27 is caused to cover the channel 5 earlier or later, thus varying the quantity of oil to be injected. By turning the lever 30 and the cage 28 the moment of injection is varied.

For such engines where the injection is wanted at a constant crankangle, the slide is arranged to connect the channels 5 and 6 or 7 as soon as the differential plunger 2 has cut off the connection between the groove 25 and the annular space 26, whereby the plunger 2 follows the cam downwards. As the edge 27 covers the channel 5, the differential plunger 2 rests on the oil, and the injection is ended. By turning the plunger 2, the edge 27 is caused to cover the channel 5 earlier or later, thus varying the quantity of oil to be delivered.

Two or three plungers and slides may be arranged in a block and moved by the two concentric cams, thus making a pump for a four or six cylinder engine.

The pump above described gives constant pressure of the oil at all speeds of the engine and good atomizing with a simple atomizer. It works quietly and can be used for great pressures and small quantities of oil even at high speeds. Air in the oil cannot be trapped inside the pump, but passes through the atomizer. As no valves are provided, small particles in the oil will not cause trouble.

Having now particularly described and ascertained the nature of my said invention and in what manner the same is to be performed, I declare that what I claim is:—

1. A fuel injection pump comprising a differential plunger axially movable in a pump body, a pressure space between the two parts of the differential plunger and the pump body having an inlet channel and an outlet channel for the fuel, a spring arranged to perform the delivery stroke of the differential plunger, means for axially moving the differential plunger and compressing the spring, the differential plunger being adapted to close the inlet channel at the beginning of the delivery stroke and the outlet channel at the end of the delivery stroke.

2. A fuel injection pump comprising a spring-loaded differential plunger axially movable in a pump body, a pressure space between the two parts of the differential plunger and the pump body having an inlet channel and an outlet channel for the fuel, means for axially moving the differential plunger and compressing the spring at the suction stroke and means for turning the differential plunger in the pump body, one part of the differential plunger having an inclined edge adapted to close the outlet channel at the end of the delivery stroke.

SVEN BERNHARD RENNERFELT.